United States Patent
Cohen et al.

(10) Patent No.: US 10,460,033 B2
(45) Date of Patent: Oct. 29, 2019

(54) STRUCTURED KNOWLEDGE MODELING, EXTRACTION AND LOCALIZATION FROM IMAGES

(71) Applicant: Adobe Inc., San Jose, CA (US)

(72) Inventors: Scott D. Cohen, Sunnyvale, CA (US); Walter Wei-Tuh Chang, San Jose, CA (US); Brian L. Price, San Jose, CA (US); Mohamed Hamdy Mahmoud Abdelbaky Elhoseiny, Piscataway, NJ (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/978,421

(22) Filed: Dec. 22, 2015

(65) Prior Publication Data

US 2017/0132498 A1    May 11, 2017

Related U.S. Application Data

(60) Provisional application No. 62/254,147, filed on Nov. 11, 2015.

(51) Int. Cl.
  *G06F 17/27*  (2006.01)
  *G06K 9/46*  (2006.01)
  *G06K 9/62*  (2006.01)

(52) U.S. Cl.
  CPC ....... *G06F 17/2785* (2013.01); *G06K 9/4685* (2013.01); *G06K 9/6232* (2013.01)

(58) Field of Classification Search
  CPC ........... G06F 17/2735; G06F 17/30256; G06F 17/218; G06F 17/2785; G06F 17/30247;
  (Continued)

(56) References Cited

U.S. PATENT DOCUMENTS 7,814,040 B1    10/2010    Zhang et al.
9,483,701 B1 *  11/2016    Kwatra ............... G06K 9/6255
(Continued)

FOREIGN PATENT DOCUMENTS

CN    1936892    3/2007
CN    105938485    9/2016

OTHER PUBLICATIONS

"Combined Search and Examination Report", GB Application No. 1615371.0, dated Mar. 8, 2017, 6 pages.
(Continued)

*Primary Examiner* — Kenny A Cese
(74) *Attorney, Agent, or Firm* — SBMC

(57) ABSTRACT

Techniques and systems are described to model and extract knowledge from images. A digital medium environment is configured to learn and use a model to compute a descriptive summarization of an input image automatically and without user intervention. Training data is obtained to train a model using machine learning in order to generate a structured image representation that serves as the descriptive summarization of an input image. The images and associated text are processed to extract structured semantic knowledge from the text, which is then associated with the images. The structured semantic knowledge is processed along with corresponding images to train a model using machine learning such that the model describes a relationship between text features within the structured semantic knowledge. Once the model is learned, the model is usable to process input images to generate a structured image representation of the image.

20 Claims, 13 Drawing Sheets

(58) Field of Classification Search
CPC ............ G06F 17/30253; G06F 19/345; G06K 9/00624; G06K 9/4685; G06K 9/6232; G06T 2207/20081
See application file for complete search history.

(56) References Cited

U.S. PATENT DOCUMENTS

| | | | |
|---|---|---|---|
| 2009/0313294 A1 | 12/2009 | Mei et al. | |
| 2014/0037198 A1* | 2/2014 | Larlus-Larrondo | G06K 9/00 382/159 |
| 2014/0270482 A1* | 9/2014 | Chakraborty | G06K 9/00221 382/154 |
| 2014/0328570 A1* | 11/2014 | Cheng | G11B 27/10 386/241 |
| 2015/0178786 A1* | 6/2015 | Claessens | G06Q 30/0269 705/14.66 |
| 2015/0294192 A1* | 10/2015 | Lan | G06F 16/285 382/159 |
| 2016/0110471 A1 | 4/2016 | Bagheri et al. | |
| 2017/0061250 A1 | 3/2017 | Gao et al. | |
| 2017/0132526 A1 | 5/2017 | Cohen et al. | |

OTHER PUBLICATIONS

"Combined Search and Examination Report", GB Application No. 1615373.6, dated Mar. 8, 2017, 6 pages.
"Foreign Office Action", GB Application No. 1615373.6, dated Mar. 6, 2019, 4 pages.
"Foreign Office Action", GB Application No. 1615371.0, dated Mar. 6, 2019, 7 pages.
"First Action Interview Office Action", U.S. Appl. No. 14/978,350, dated Jul. 8, 2019, 7 pages.
"Pre-Interview First Office Action", U.S. Appl. No. 14/978,350, dated Apr. 15, 2019, 8 pages.

* cited by examiner

200

1100

STRUCTURED KNOWLEDGE MODELING, EXTRACTION AND LOCALIZATION FROM IMAGES

RELATED APPLICATIONS

This application claims priority to U.S. Provisional Patent Application No. 62/254,147, filed Nov. 11, 2015, and titled "Structured Knowledge Modeling, Extraction, and Localization from Images," the disclosure of which is incorporated by reference in its entirety.

BACKGROUND

Image searches involve the challenge of matching text in a search request with text associated with the image, e.g., tags and so forth. For example, a creative professional may capture an image and associate tags having text that are used to locate the image. On the other side, a user trying to locate the image in an image search enters one or more keywords. Accordingly, this requires that the creative professional and the users reach agreement as to how to describe the image using text in order for the user to locate the image and for the creative professional to make the image available to user's that desire the image. As such, conventional tag and keyword search techniques may be prone to error, misunderstandings, and different interpretations thus leading to inaccurate search results.

Further, conventional search techniques for images do not support high precision semantic image search due to limitations of conventional image tagging and search. This is because conventional techniques merely associate tags with the images, but do not define relationships between the tags nor with the image itself. As such, conventional search techniques cannot achieve accurate search results for complex search queries, such as a "man feeding a baby in a high chair with the baby holding a toy." Consequently, these conventional search techniques force users to navigate through tens, hundreds, and even thousands of images oftentimes using multiple search requests in order to locate an image of interest.

SUMMARY

Techniques and systems to extract and model structured knowledge from images are described. In one or more implementations, a digital medium environment is configured to learn and use a model to compute a descriptive summarization of an input image automatically and without user intervention. Training data (e.g., image and unstructured text such as captions) is first obtained to train a model using machine learning in order to generate a structured image representation that serves as the descriptive summarization of an input image.

The images and associated text are then processed to extract structured semantic knowledge from the text, which is then associated with the images. Structured semantic knowledge may take a variety of forms, such as <subject, attribute> and <subject, predicate, object> tuples that function as a statement linking the subject to the object via the predicate. This may include association with the image as a whole and/or objects within the image through a process called "localization."

The structured semantic knowledge is then processed along with corresponding images to train a model using machine learning such that the model describes a relationship between text features within the structured semantic knowledge (e.g., subjects and objects) and image features of images, e.g., portions of the image defined in bounding boxes that include the subjects or objects.

Once the model is learned, the model is then usable to process input images to generate a structured image representation of the image. The structured image representation may include text that is structured in a way that describes relationships between objects in the image and the image itself. The structured image representation may be used to support a variety of functionality, including image searches, automatic caption and metadata generation, object tagging, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
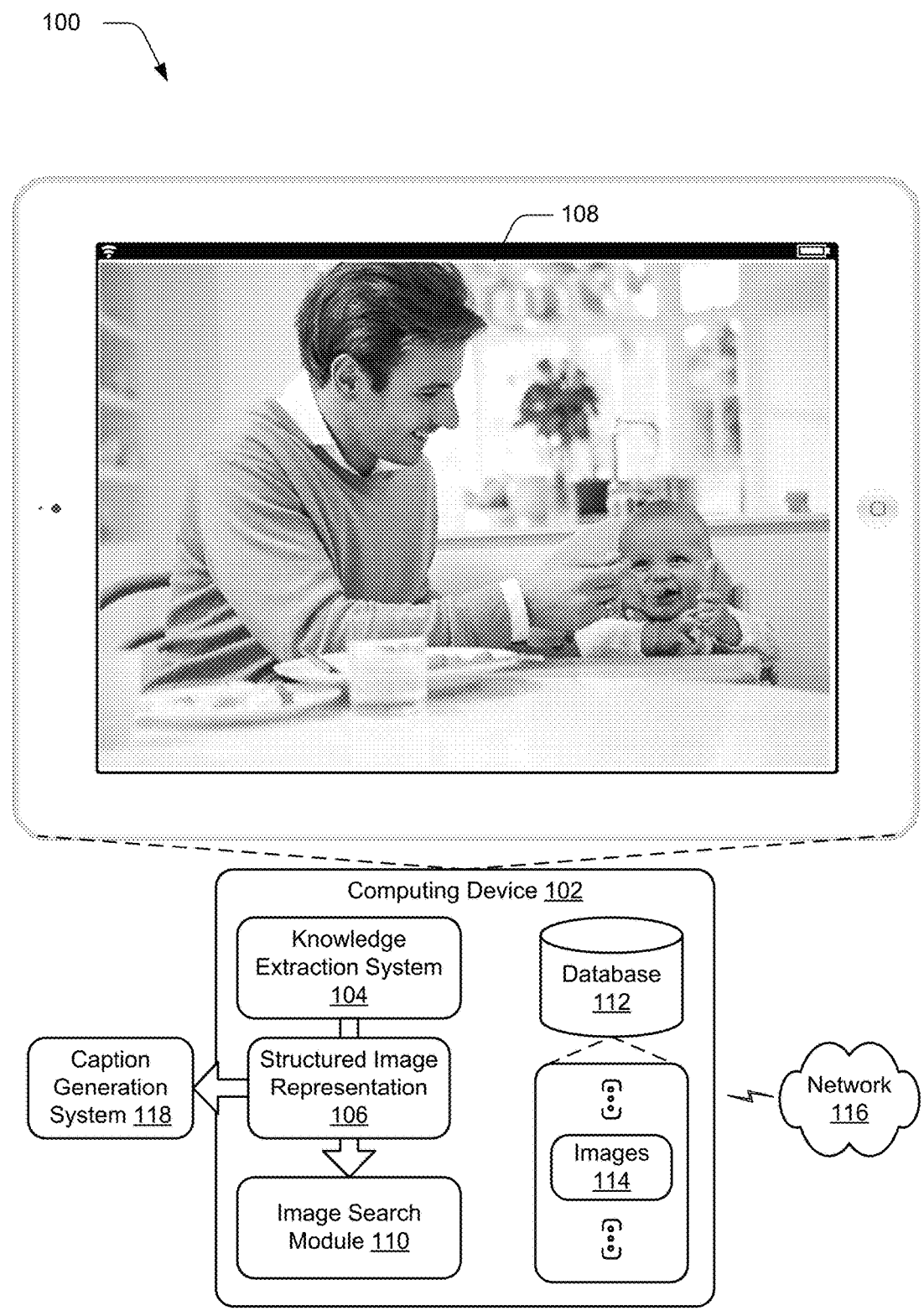
FIG. 1 is an illustration of an environment in an example implementation that is operable to employ knowledge extraction techniques from images as described herein.

Techniques and systems are described that support knowledge extraction from an image in order to generate a descriptive summarization of the image, which may then be used to support image search, automatic generations of captions and metadata for the image, and a variety of other uses. The descriptive summarization, for instance, may describe qualities of the image as a whole as well as attributes, objects, and interaction of the objects, one to another, within the image as further described below. Accordingly, although examples involving image searches are described in the following, these techniques are equally applicable to a variety of other examples such as automated structured image tagging, caption generation, and so forth.

Training data is first obtained to train a model using machine learning in order to generate a structured image representation. Techniques are described herein in which training data is obtained that uses images and associated text (e.g., captions of the images which include any type of text configuration that describes a scene captured by the image) that may be readily obtained from a variety of sources. The images and associated text are then processed automatically and without user intervention to extract structured semantic knowledge from the text, which is then associated with the images. This may include association with the image as a whole and/or objects within the image through a process called "localization" in the following. Use of this training data differs from conventional techniques that rely on crowd sourcing in which humans manually label images, which can be expensive, prone to error, and inefficient.

In one example, structured semantic knowledge is extracted from the text using natural language processing. Structured semantic knowledge may take a variety of forms, such as <subject, attribute> and <subject, predicate, object> tuples that function as a statement linking the subject to the object via the predicate. The structured semantic knowledge is then processed along with corresponding images to train a model using machine learning such that the model describes a relationship between text features within the structured semantic knowledge (e.g., subjects and objects) and image features of images, e.g., portions of the image defined in bounding boxes that include the subjects or objects. In one example, the model is a joint probabilistic model that is built without requiring reduction of a large vocabulary of individual words to small pre-defined set of concepts and as such the model may directly address this large vocabulary, which is not possible using conventional techniques.

For example, localization techniques may be employed such that the structured semantic knowledge is mapped to corresponding object within an image. A<baby, holding, toy> tuple, for instance, may map the subject "baby" in an image to the object "toy" in the image using the predicate "holding" and thus provides a structure to describe "what is going on" in the image, which was not possible in conventional unstructured tagging techniques. Thus, use of explicit, structured knowledge provided by the techniques described herein may be leveraged in a way that is searchable by a computing device.

If one searches for images of a "red flower", for instance, a conventional bag-of-words approach considers "red" and "flower" separately, which may return images of flowers that are not red but have red elsewhere in the image. However, use of the techniques described herein know that a user is looking for the concept of <flower, red> from a structure of a search request which is then used to locate images having a corresponding structure. In this way, the model may achieve increased accuracy over techniques that rely on description of the image as a whole as further described in relation to FIGS. 5 and 6 in the following.

Figure 8:
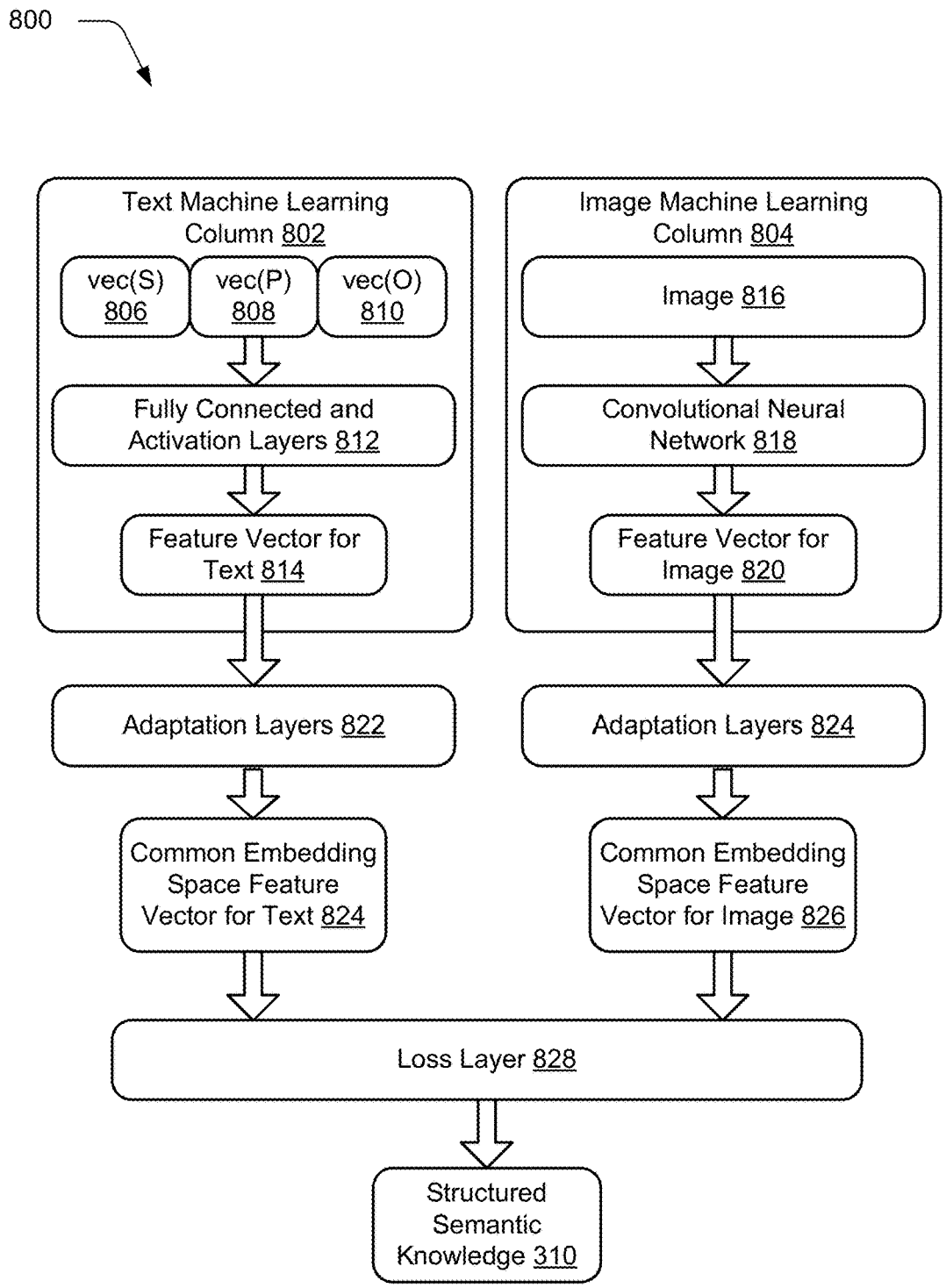
FIG. 8 depicts an example implementation showing training of a model using a two-column machine learning system.

Further, this mapping may employ a common vector space that penalizes differences such that similar semantic concepts are close to each other within this space. For example, this may be performed for feature vectors for text such that "curvy road" and "winding road" are relatively close to each other in the vector space. Similar techniques are usable to promote similar concepts for image vectors as well as to adapt the image and text vectors to each other. A variety of machine learning techniques may be employed to train the model to perform this mapping. In one such example, a two column deep network is used to learn the correlation between the structured semantic information and an image or portion of an image, e.g., bounding box, an example of which is shown in FIG. 8.

Once the model is learned, the model is then usable to process input images to generate a structured image representation of the image through calculation of a confidence value to describe which text best corresponds with the image. The model, for instance, may loop over bounding boxes of parts of the image to determine which structured text (e.g., <flower, red>) likely describes that part of the image such as objects, attributes, and relationships there between through calculation of probabilities (i.e., the confidence values) that the structured text describes a same concept as image features in the image. In this way, the structured image representation provides a descriptive summary of the image that uses structured text to describe the images and portions of the image. The structured image representation may thus be calculated for an image to include text that is structured in a way that describes relationships between objects in the image (e.g., flower), attributes of the object (e.g., red), relationships between (e.g., <flower, red> <baby, holding, toy>) and the image itself as described above. The structured image representation may be used to support a variety of functionality, including image searches, automatic caption and metadata generation, automated object tagging, and so forth. Further discussion of these and other examples is included in the following sections.

In the following discussion, an example environment is first described that may employ the knowledge extraction techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ knowledge extraction techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), wearables, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 13.

The computing device 102 is illustrated as including a knowledge extraction system 104 that is representative of functionality to form a structured image representation 106 from an image 108 that descriptively summarizes the image 108. The structured image representation 106 is usable to support a variety of functionality, such as to be employed by an image search module 110 to search a database 112 of images 114 based on corresponding structured image representations. As previously described, other uses of the structured image representation 106 are also contemplated, such as automatic generation of captions and metadata for images as represented by a caption generation system 118. Additionally, although the knowledge extraction system 104 and image search module 110 and database 112 are illustrated as implemented using computing device 102, this functionality may be further divided "over the cloud" via a network 116 as further described in relation to FIG. 13.

The structured image representation 106 provides a set of concepts with structure that describes a relationship between entities included in the concepts. Through this, the structured image representation may function as an intermediate representation of the image 108 using text to describe not only "what is included" in the image 108 but also a relationship, one to another, of entities and concepts included in the image 108. This may be used to support a higher level of semantic precision in an image search that is not possible using conventional techniques that relied on unstructured tags.

A high precision semantic image search, for instance, involves finding images with the specific content requested in a textual search query. For example, a user may input a search query of a "man feeding baby in high chair with the baby holding a toy" to an image sharing service to locate an image of interest that is available for licensing. Conventional techniques that relied on unstructured tags, however, are not able to accurately satisfy this query. In practice, conventional image search provide images typically satisfy some, but not all, of the elements in the query, such as a man feeding a baby, but the baby is not holding a toy, a baby in a high chair, but there is no man in the picture, a picture of a woman feeding a baby holding a toy, and so forth due to this lack of structure.

A structured image representation 106, however, provides an explicit representation of what is known about an image 108. This supports an ability to determine which concepts in a search query are missing in a searched database image and thus improve accuracy of search results. Accordingly, a measure of similarity between the search query and an image 114 in a database 112 can incorporate which and how many concepts are missed. Also, if there is an image that is close to satisfying the querying but misses a concept, techniques may be employed to synthesize a new image using the close image and content from another image that contains the missing concept as further described in the following.

Consider an example of use of the structured image representation 106 in which the extracted knowledge of the image 108 includes the following:

{<man, smiling>, <baby, smiling>, <baby, holding, toy>, <man, sitting at, table>, <baby, sitting in, high chair>, <man, feeding, baby>, <baby, wearing, blue clothes>}.

The caption generation system 118 is configured to use this extracted knowledge to generate a caption as follows:

"A man is feeding a smiling baby while the baby holds a toy. The baby is sitting in a high chair. The man is happy too. It is probably a dad feeding his son. The dad and his son are having fun together while mom is away."

Thus, the explicit representation of knowledge of the structured image representation 106 allows for a multiple sentence description of the scene of the image 108 as a caption in this example that is formed automatically and without user intervention. The first two sentences are a straightforward inclusion of the concepts <man, feeding, baby>, <baby, holding, toy>, and <baby, sitting in, high chair>. The third sentence involves reasoning based on the concepts <man, smiling> and <baby, smiling> to deduce by the caption generation system 118 that the man is happy and to add the "too" because both the baby and man are smiling. The fourth sentence also uses reasoning on the extracted concept that the baby is wearing blue to deduce that the baby is a boy.

The caption generation system 118 may also use external statistical knowledge, e.g., that most of the time when a man is feeding a baby boy, it is a father feeding his son. The generated fourth sentence above is tempered with "It is probably . . . " because statistics may indicate a reasonable amount of uncertainty in that deduction and because there may also be uncertainty in the deduction that the baby is boy because the baby is wearing blue clothes. Since the structured image representation 106 may be used to all extract relevant information about the scene, the absence of information may also be used as part of deductions performed by the caption generation system 118. In this case, the structured image representation 106 does not mention a woman as being present in the image 108. Thus, the caption generation system 118 may deduce that the "mom is away" and combined with the concepts that the man and baby are smiling, generate the final sentence "The dad and his son are having fun together while mom is away."

Note that a caption generation system 118 may avoid use of some of the extracted information. In this case, the caption did not mention that the man was sitting at the table because the caption generation system 118 deemed that concept uninteresting or unimportant in describing the scene or that it could be deduced with high probability from another concept such as that the baby is sitting in a high chair. This reasoning is made possible through use of the structured image representation 106 as a set of structured knowledge that functions as an descriptive summarization of the image 106 using text.

The structured image representation 106 may also include part-of-speech (POS) tags such as singular noun, adjective, adverb, and so on for the extracted subjects, predicates, actions, attributes, and objects. The part-of-speech tags can be used as part of reasoning as described above as well as slot filling in a grammar-based caption generation approach, and to ensure that a valid sentence is generated as further described below.

Additionally, explicit extraction of knowledge of images 108 at the level of objects within the image 108 and corresponding attributes and interactions allows for further reasoning about middle and higher level scene properties.

The deductions about the baby being a boy, the man being happy, and the dad and son having fun while mom is away are examples.

Figure 2:
FIG. 2 depicts another example of an image from which knowledge is extracted using a knowledge extraction system of FIG. 1.

FIG. 2 depicts another example of an image 200. In this example, the structured image representation 106 may include the following knowledge this is extracted from the image 200:

{<soccer ball>, <person 1, wearing, blue shirt>, <person 2, wearing, red shirt>, <person 3, wearing, red shirt>, <person 4, wearing, red shirt>, <person 5, wearing, blue shirt>, <person 6, wearing, blue shirt>, <field>, <person 5, kicking, soccer ball>, <person 6, running>, <person 4, chasing, person 5>, <person 3, running>, <person 1, running>}.

The existence of a soccer ball indicates that the people are playing soccer, which is further supported by knowledge that one of the people are kicking the soccer ball. That there are only two different color shirts indicates that there are two teams playing a game. This is backed up by the knowledge that a person in red is actually chasing the person in blue that is kicking the ball, and that other people are running on a field. From this extracted object level knowledge, scene level properties may be deduced by the caption generation system 118 with enhanced object level descriptions, such as "A soccer match between a team in red and a team in blue".

Further reasoning and deduction about scenes and their constituent objects and actions may also be achieved by building a knowledge base about the content of images where the knowledge base is then used by a reasoning engine. The construction of a knowledge base, for instance, may take as an input structured knowledge describing images such as <subject, attribute, ->, <subject, predicate, object>, <subject,-,->, <-,action,->. Input data for constructing the knowledge base can be taken from existing image caption databases and image captions and surrounding text in documents. The ability of the techniques described herein to extract such knowledge from any image allows the image knowledge base to include much more data from uncaptioned and untagged images, which is most images. The image knowledge base and corresponding reasoning engine can make deductions such as those needed in the man feeding baby captioning example above. The image knowledge base can also provide the statistics to support the probabilistic reasoning used in that example such as deducing that the man is likely the baby's father. If the example had included an attribute like <man, old>, then a more likely deduction may include that the man is the baby's grandfather.

Having described examples of an environment in which a structured image representation 106 is used to descriptively summarize images 114, further discussion of operation of the knowledge extraction system 104 to generate and use a model to as part of knowledge extraction from images is included in the following.

Figure 3:
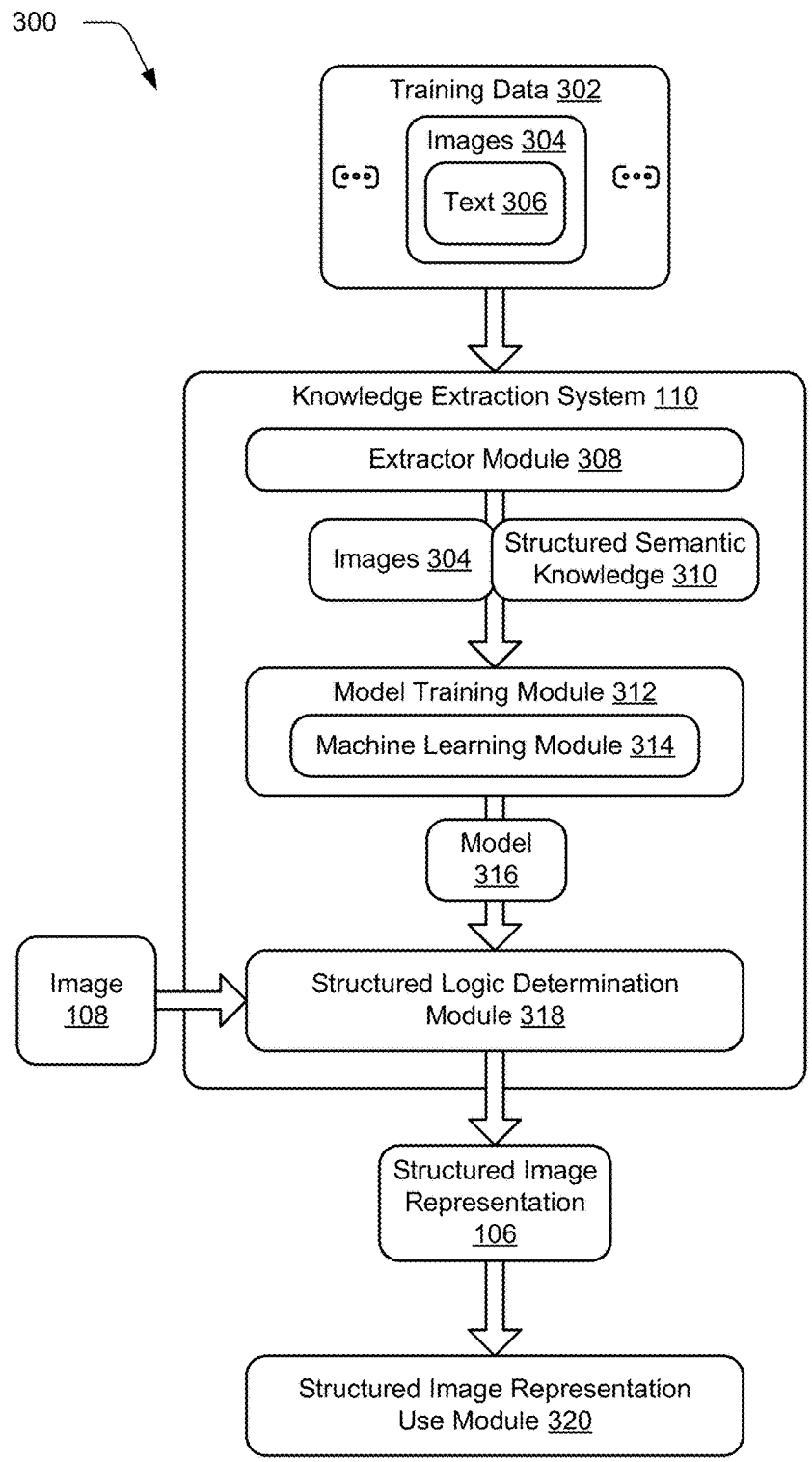
FIG. 3 depicts a system showing the knowledge extraction system of FIG. 1 in greater detail.

FIG. 3 depicts a system 300 an example implementation showing the knowledge extraction system 104 of FIG. 1 in greater detail. In this example, the knowledge extraction system 104 employs a machine learning approach to generate the structured image representation 106. Accordingly, training data 302 is first obtained by the knowledge extraction system 110 that is to be used to train the model that is then used to form the structured image representation 106. Conventional techniques that are used to train models in similar scenarios (e.g., image understanding problems) rely on users to manually tag the images to form the training data 302, which may be inefficient, expensive, time-consuming, and prone to error. In the techniques described herein, however, the model is trained using machine learning using techniques that are performable automatically and without user intervention.

In the illustrated example, the training data 302 includes images 304 and associated text 306, such as captions or metadata associated with the images 304. An extractor module 308 is then used to extract structured semantic knowledge 310, e.g., "<Subject,Attribute>, Image" and "<Subject,Predicate,Object>, Image", using natural language processing as further described in relation to FIG. 4. Extraction may also include localization of the structured semantic knowledge 310 to objects within the image as further described in relation to FIGS. 5 and 6.

The images 304 and corresponding structured semantic knowledge 310 are then passed to a model training module 312. The model training module 312 is illustrated as including a machine learning module 314 that is representative of functionality to employ machine learning (e.g., neural networks, convolutional neural networks, and so on) to train the model 316 using the images 304 and structured semantic knowledge 310. The model 316 is trained to define a relationship between text features included in the structured semantic knowledge 310 with image features in the images as further described in relation to FIG. 7.

The model 316 is then used by a structured logic determination module 318 to generate a structured image representation 106 for an input image 108. The structure image representation 106, for instance, may include text that is structured to define concepts of the image 108, even in instances in which the image 108 does not have text. Rather, the model 316 is usable to generate this text as part of the structured image representation 106, which is then employed by the structured image representation use module 320 to control a variety of functionality, such as image searches, caption and metadata generation, and so on automatically and without user intervention. Having described example modules and functionality of the knowledge extraction system 110 generally, the following discussion includes a description of these modules in greater detail.

Figure 4:
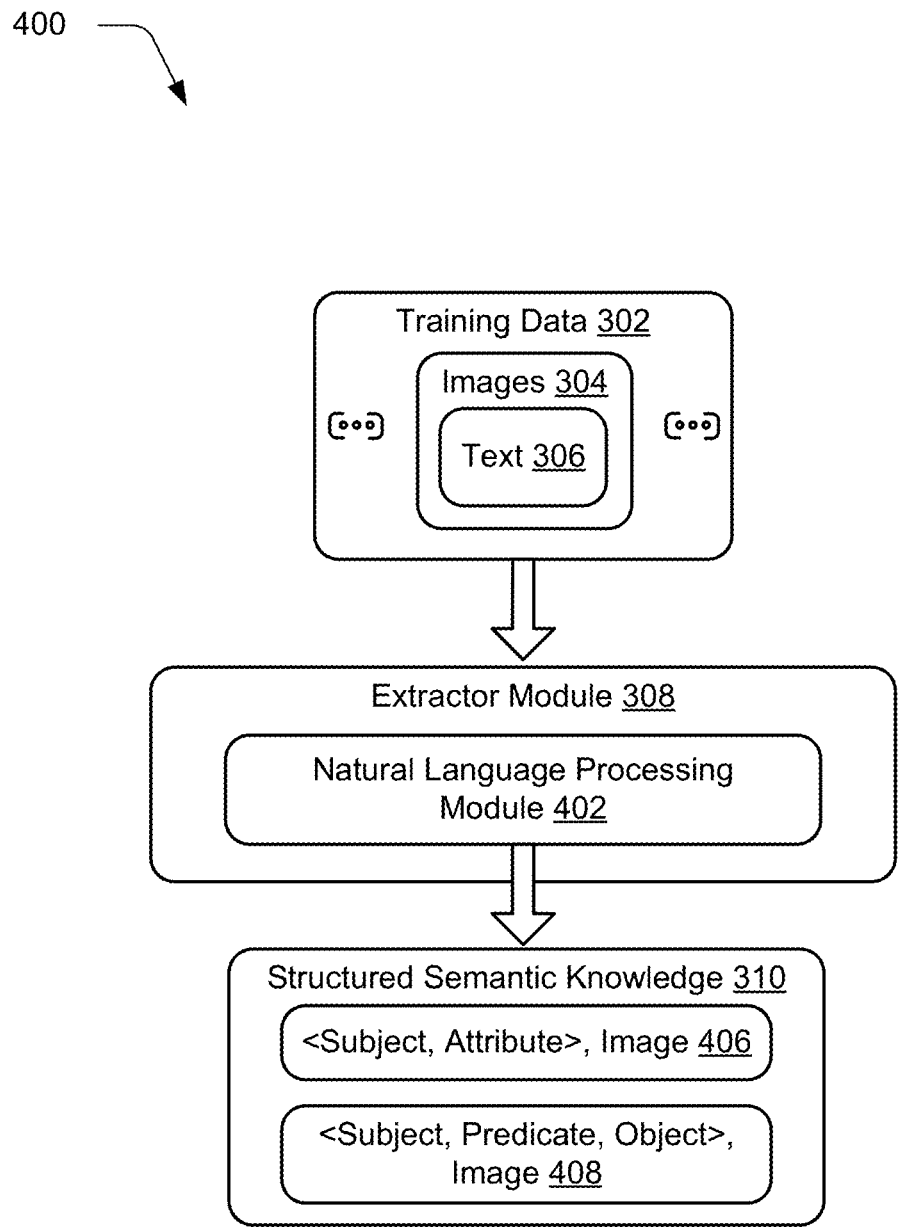
FIG. 4 depicts an example implementation showing an extractor module of FIG. 3 in greater detail.

FIG. 4 depicts an example implementation 400 showing the extractor module 308 of FIG. 3 in greater detail. The extractor module 308 includes a natural language processing module 402 that is representative of functionality to use natural language processing (NLP) for semantic knowledge extraction from free-form (i.e., unstructured) text 306 associated with images 304 in the training data 302. Such free-form descriptions are readily available in existing image caption databases and documents with images such as web pages and PDF documents and thus the natural language processing module 402 may take advantage of this availability, which is not possible using conventional manual techniques. However, manual techniques may also be employed in which a worker generates text 306 captions for images 304 to describe the images 304.

The structured semantic knowledge 310 is configurable in a variety of ways as previously described, such as "<subject, attribute>, image" 406 and/or "<subject, predicate, object>, image" 408 tuples. Examples of captions and structured knowledge tuples as performed by the extractor module 308 include "A boy is petting a dog while watching TV" which is then extracted as "<boy, petting, dog>, <boy, watching, tv>." In another example, a caption "A brown horse is eating grass in a big green field" is then extracted as "<horse, brown>, <field, green>, <horse, eating, grass>, <horse, in, field>."

A variety of tuple extraction solutions may be employed by the natural language processing module 402. Additionally, in some instances a plurality of tuple extraction techniques may be applied to the same image caption and consensus used among the techniques to correct mistakes in tuples, remove bad tuples, and identify high confidence tuples or assign confidences to tuples. A similar technique may be employed in which a tuple extraction technique is used to perform tuple extraction jointly on a set of captions for the same image and consensus used to correct mistakes in tuples, remove bad tuples, and identify high confidence tuples or assign confidences to tuples. This data is readily available from existing databases as images oftentimes have multiple captions. Additionally, inputs obtained from crowd sourcing may also be used confirm good tuples and to remove bad tuples.

In one or more implementations, abstract meaning representation (AMR) techniques are used by the natural language processing module 402 to aid in tuple extraction. AMR is aimed at achieving a deeper semantic understanding of free-form text. Although it does not explicitly extract knowledge tuples of the form <Subject, Attribute> or <Subject, Predicate, Object>, a tuple representation may be extracted from an AMR output. Additionally, knowledge tuples may be extracted from a scene graph (e.g., a Stanford Scene Graph dataset) which is a type of image representation for capturing object attributes and relationships for use in semantic image retrieval.

Figure 5:
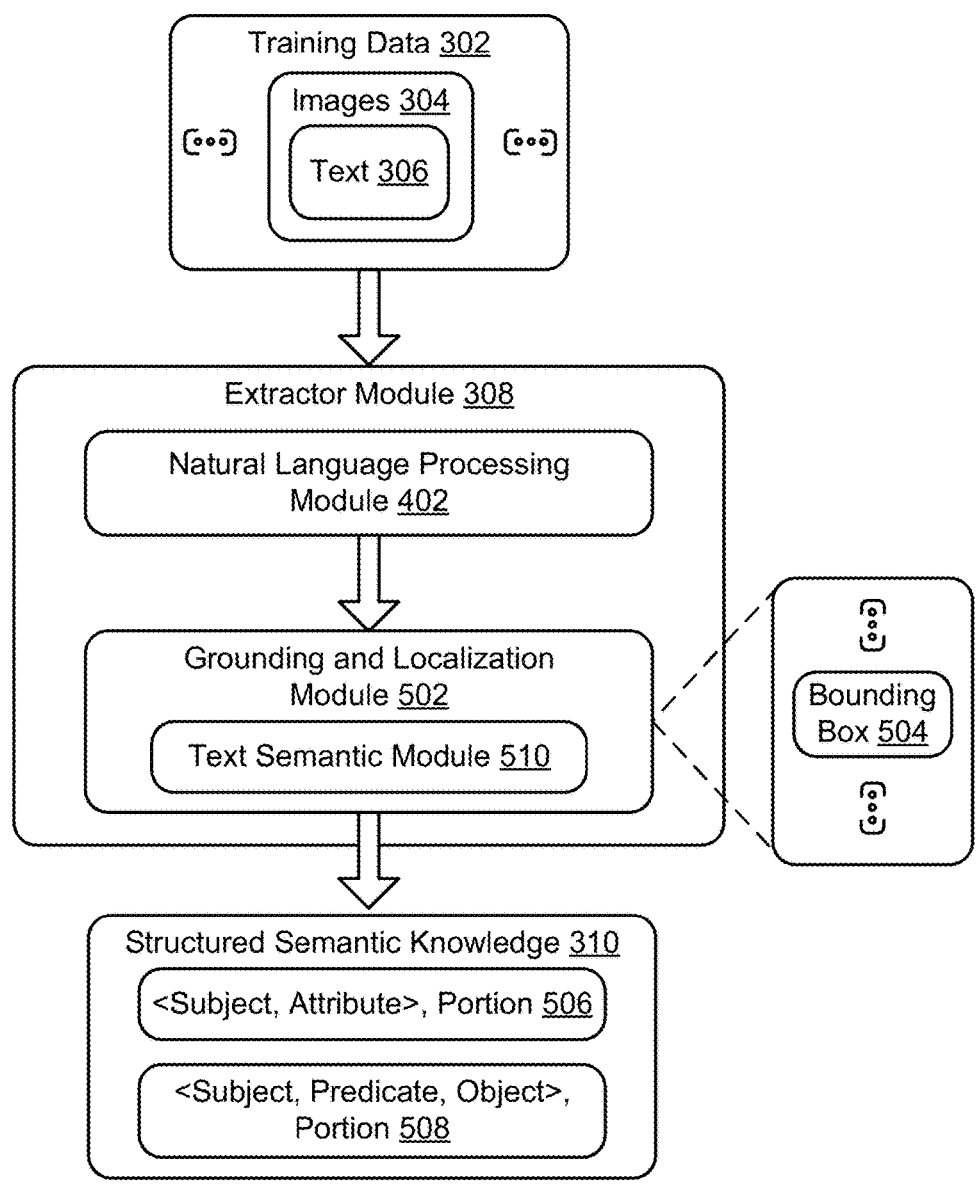
FIG. 5 depicts an example system in which an extractor module of FIG. 4 is shown as including localization functionality as part of knowledge extraction.

FIG. 5 depicts an example system 500 in which the extractor module 308 of FIG. 4 is shown as including localization functionality as part of knowledge extraction. In addition to extraction of structured semantic knowledge 310 to describe an image as a whole as part of the training data 302, structured semantic knowledge 310 may also be localized within an image to promote efficient and correct machine learning.

If there is a complex scene with a man walking a dog, for instance, then the structured semantic knowledge 310 may be configured as "<man, walking, dog>, image data" with the image data referring to a portion of the image 304 that includes the man walking the dog, which is referred to as a bounding box 504 in the following. Thus, tuples of the structured semantic knowledge 310 may refer to portions within the image, examples of which are represented as "<subject, attribute>, portion" 506 and "<subject, predicate, object>, portion" 508.

Accordingly, this may promote accuracy in training and subsequent use for images having multiple entities and corresponding actions. For example, if an entirety of an image that is captioned that includes multiple concepts, e.g., a woman jogging or a boy climbing a tree, then any machine learning performed will be confronted with a determination of which part of the image is actually correlated with <man, walking, dog>. Therefore, the more the structured semantic knowledge 310 is localized, the easier it will be to fit a high quality model that correlates images and structured text by the model training module 312. The problem of associating parts of a textual description with parts of an image is also called "grounding".

The grounding and localization module 502 may employ a variety of techniques to perform localization. In one example, object detector and classifier modules that are configured to identify particular objects and/or classify objects are used to process portions of images 304. A region-CNN (convolutional neural network) or a semantic segmentation technique may also be used to localize objects in an image.

In another example, structured semantic knowledge 310 tuples such as <Subject, Attribute> and <Subject, Predicate, Object> and localized objects are identified by considering cases of how many class occurrences have been localized for the subject and object classes as further described below. This may also include identifying subjects or objects that indicate that the tuple describes an entire scene, in which case the entire training image 304 is associated with the tuple of the structured semantic knowledge 310. To do so, an external list of scene types is used, e.g., bathroom.

Before the grounding and localization module 502 can look up the bounding boxes for an object class mentioned in the subject or object of a tuple, the text used for the subject or object is mapped to a pre-defined subset of database objects since bounding boxes are typically stored according to those class labels. For example, the mapping problem may be solved from subject or object text "guy" to a pre-defined class such as "man" by using a hierarchy to perform the matching.

Once a set of bounding boxes 504 in an image 304 for the subject and object classes in a <Subject, Predicate, Object> triple or the bounding boxes 504 for a <Subject, Attribute> double are obtained, rules and heuristics are then employed by the grounding an localization module 502 to localize a tuple of the structured semantic knowledge 310 within the training image 304. In a first such example, for a <Subject, Attribute> tuple, if there is only a single occurrence of a subject class in the image 304 (e.g. just one car) then the tuple is associated with the single bounding box for that tuple since the bounding box 504 contains the subject and the attribute describes the subject within that box, e.g., "<car, shiny>."

For a <Subject, Predicate, Object> tuple with only a single occurrence of the subject class and one occurrence of the object class, the tuple is associated with the smallest rectangular image area that covers the bounding box for the subject and the bounding box for the object, i.e., the bounding box of the two bounding boxes. For example, if there is a single person and a single dog in the image, then <person, walking, dog> is localized to the person and dog bounding boxes. This likely contains the leash connecting the person and dog. In general, the tacit assumption here is that the predicate relating the subject and object is visible near the subject and object.

For a <Subject, Predicate, Object> tuple with a singular subject and a singular object ("car" not "cars") and more than one occurrence of either the subject class or the object class, the following is determined. If a nearest pair of bounding boxes 504 with one from the subject class and one from the object class is within a threshold distance, then this tuple is associated with the bounding box of the nearest pair bounding boxes. The assumption here is that relationship between a subject and object can be well localized visually. The distribution of the distances between each of the pairs may also be used to determine if there is uncertainty in this choice because of a second or third pair that also has a small distance.

The above heuristics give examples of types of information considered in localization. Additional techniques may also be used to aid localization performed by the grounding and localization module 502. An example of this is illustrated by a text semantic module 510 that is representative of functionality of use of text understanding to aid in grounding subjects and objects in the image. In one example, positional attributes associated with a subject are used to select or narrow down the correct bounding box for that subject. If there are several cars in a scene, for instance, but the caption states "There is a child sitting on the hood of the leftmost car", then the text semantic module 510 may aid in selecting the bounding box with the minimum horizontal coordinate to ground as the leftmost car in this caption and in the <child, sitting on, car> tuple extracted from it. Instead of using the bounding box of all bounding boxes for cars in the example above, the bounding box of just the grounded car or of the subset of cars that match the "leftmost" criterion may be used. This determination may be generalized to other criteria that may be measured, such as color.

In grounding a tuple, the grounding and localization module 502 first reduces a set of bounding boxes for the subject and the object using their attributes to filter out bounding boxes 504 that do not include these attributes. Such attributes include position, color, and proximity to other identifiable regions, e.g., for "the car on the grass" the grass region is discoverable using a semantic segmentation algorithm.

Relative positional information is also used to select the correct pair of subject class and object class bounding boxes for a positional relationship. For example, if the caption is "A baby sits on top of a table", then the baby and table are grounded to rectangles in the image with the baby rectangle above the table rectangle. As such, this uniquely identifies the image area to associate with this tuple if there are multiple babies and/or multiple tables in the scene.

For a <Subject, Predicate, Object> tuple with the subject and object grounded in the image, the tuple with a smallest rectangular image area that covers the bounding box for the subject and the bounding box for the object. A variety of other examples are also contemplated, such as to add an amount of context to bounding boxes through inclusion of a larger area than would otherwise be included in a "tight" bounding box.

Figure 6:
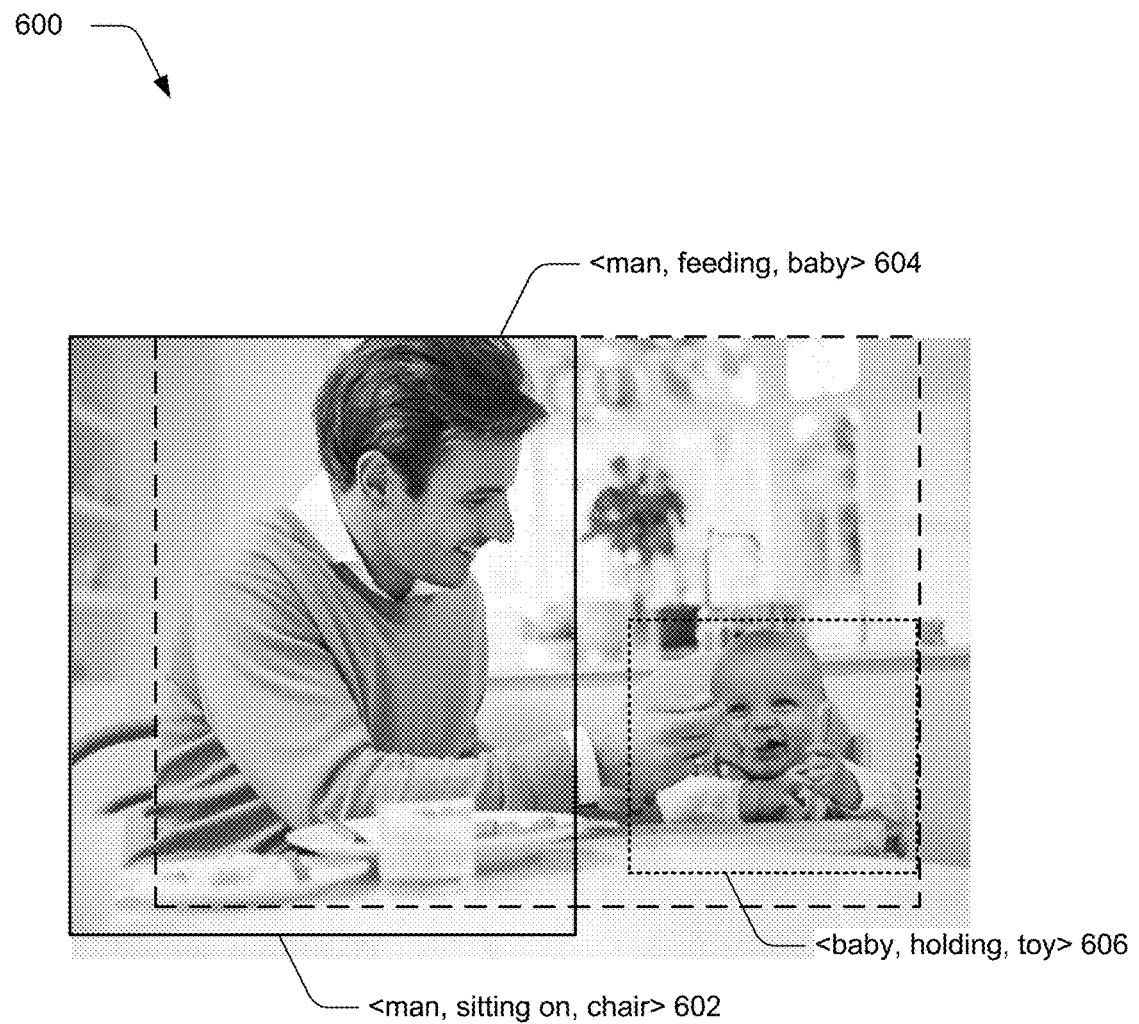
FIG. 6 depicts an example of localization of structured semantic knowledge to portions of images.

FIG. 6 depicts an example implementation 600 of localization between portions of an image 108 and structured semantic knowledge 310. As illustrated, a bounding box 602 for "<man, sitting on, chair>" includes the man and the chair. A bounding box 604 for "<man, feeding, baby>" includes both the man and the baby. A bounding box 606 for "<baby, holding, toy>" includes the baby and the toy. Having described extraction of structured semantic knowledge 310, the following includes discussion of use of this extracted structured semantic knowledge 310 to train a model 316 by the model training module 312.

Figure 7:
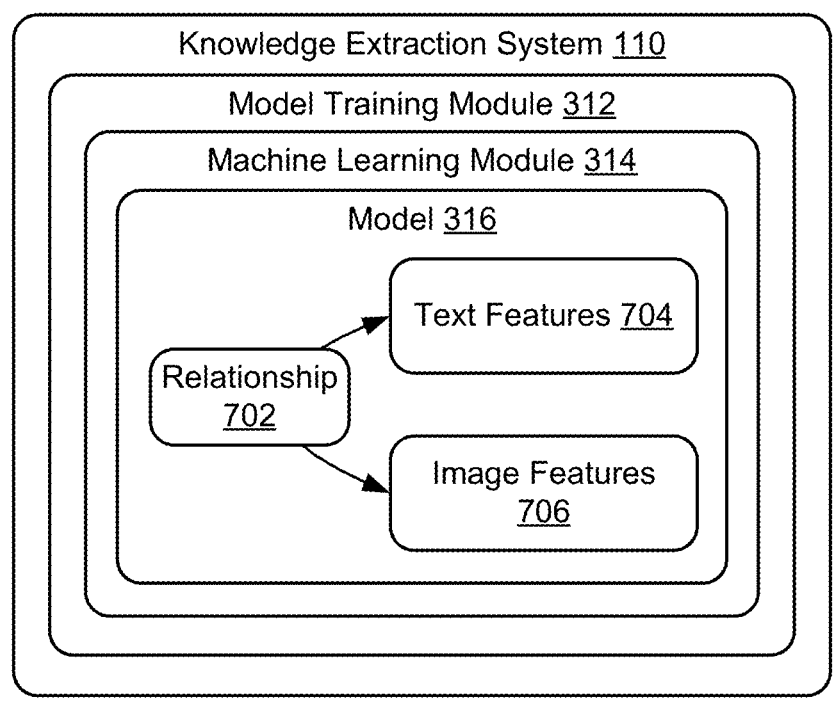
FIG. 7 depicts an example implementation showing a model training module of FIG. 3 in greater detail as employing a machine learning module to model a relationship between the structured semantic knowledge and images.

FIG. 7 depicts an example implementation 700 showing the model training module 312 in greater detail as employing a machine learning module 314 to model a relationship between the structured semantic knowledge 310 that was extracted from the test 306 and the images 304. In this example, the machine learning module 314 is configured to model a relationship 702 between text features 704 of the structured semantic knowledge 310 with image features of the image 304 of the training data 302 in order to train the model 316.

A joint probabilistic model "P(<Subject, Attribute>, Image I), P(<Subject, Predicate, Object>, Image I)" is built in this example to output a probability that image "I" and structured text <Subject, Attribute> or <Subject, Predicate, Object> represent the same real world concept visually and textually. The model 316 in this example is configured to generalize well to unseen or rarely seen combinations of subjects, attributes, predicates, and objects, and does not require explicit reduction of a large vocabulary of individual words to a small, pre-defined set of concepts.

Text-based image search involves mapping a text query (e.g., represented as a set of structured knowledge using a natural language tuple extraction technique) to an image. This is supported by a joint model as further described in relation to FIG. 8 by looping over images "I" and checking which gives a high probability "P(structured text <S,P,O>, image I)" for a given concept <S,P,O>. Knowledge extraction/tagging is supported by looping over possible concepts <S,P,O> and checking which gives a high probability "P(structured text <S,P,O>, image I)" for a given image or image portion "I."

There are two parts to the modeling: (1) a feature representation for the structured text "<S,P,O>," "<S,A,->," "<S,-,->" (where "-" indicates an unused slot to represent all concepts as triples) and for images, and (2) a model for correlating text feature "t" 704 and image feature "x: P(t,x)" 706.

The structured semantic knowledge 310 "<S,P,O>" and "<S,A>" tuples are configured such that similar structured knowledge concepts have nearby and related representations, e.g., as vectors in a vector space. This supports generalization and use of a large vocabulary. For example, text feature 704 representations of "<road, curvy>" and "<road, winding>" are configured to be similar and the representations between "<dog, walking>" and "<person, walking>" are related by the common action of walking. This may be performed such that similar words are nearby in the space and the vector space captures some relationships between words. For example, vec("man")+(vec("queen")−vec("woman"))=vec("king").

The model training module 312 may also be configured to build upon semantic vector representations of single words to develop a vector representation of knowledge tuples which captures the relationship between two concepts "<S1, P1,O1>" and "<S2,P2,O2>." Specifically, a feature vector is built for an "<S,P,O>" triple as a function of single word representations "vec(S)," "vec(P)," and "vec(O)." The "vec (<S,P,O>)" is built as a concatenation of the individual word vectors "vec(<S,P,O>)=[vec(S) vec(P) vec(O)]."

When an "<S,P,O>" element is missing, such as the object "O" when representing a "<Subject, Attribute>" or both a predicate "P" and object "O" when representing a "<Subject>," the corresponding vector slot is filled using zeros. Thus the vector representation for a subject, solely, lies along the "S" axis in "S,P,O" space. Visual attributes may be addressed as modifiers for an unadorned subject that move the representation of "<S,P>" into the "SP" plane of "S,P,O" space. Another option involves summing the vector representations of the individual words.

For a compound "S" or "P" or "O," the vector representation for each individual word in the phrase is averaged to insert a single vector into a target slot of a "[vec(S) vec(P) vec(O)]" representation. For example, "vec("running toward")" is equal to "0.5*(vec("running")+vec("toward"))." A non-uniform weight average may also be used when some words in the phrase carry more meaning than others. In an implementation, a semantic representation (e.g., vector or probability distribution) is learned directly for compound phrases such as "running toward" or "running away from" by treating these phrases atomically as new vocabulary elements in an existing semantic word embedding model.

There are a variety of choices of techniques that are usable to capture semantics of image features 706. In one such example, a deep machine learning network is used that has a plurality of levels of features that are learned directly from the data. In particular, convolution neural networks (CNNs) with convolution, pooling, and activation layers (e.g., rectified linear units that threshold activity) have been proven for image classification. Examples include AlexNet, VGGNet, and GoogLeNet.

Additionally, classification features from deep classification nets have been shown to give high quality results on other tasks (e.g. segmentation), especially after fine tuning these features for the other task. Thus, starting from features learned for classification and then fine tuning these features for another image understanding task may exhibit increased efficiency in terms of training than starting training from scratch for a new task. For the reasons above, CNN features are adopted as fixed features in a baseline linear CCA model. The machine learning module 314 then fine tunes the model 316 from a CNN in a deep network for correlating text and images features 704, 706.

The machine learning module 316 is configured to map text features "t" 704 and image features "x" 706 into a common vector space and penalize differences in the mapped features when the same or similar concepts are represented by "t" and "x."

One technique that may be leveraged to do so include a linear mapping referred to as Canonical Correlation Analysis (CCA) which is applied to text and image features 704, 706. In CCA, matrices "T" and "X" are discovered that map feature vectors "t" and "x," respectively, into a common vector space "t'=Tt" and "x'=Xx." If the mapping is performed into a common space of dimension "D," and "t" is a vector in "D_t-dimensional space," and "x" is a vector in "D_x-dimensional space," then "T" is a "(D by D_t)" matrix, "X" is a "(D by D_x)" matrix, and the mapped representations t' and x' are D-dimensional vectors.

Loss functions may be employed for model fitting using training pairs "(t,x)" based on squared Euclidean distance "‖t'−x'‖_2^2" or a cosine similarity "dot_product(t',x')" or the "angle_between(t',x')" which removes the vector length from the cosine similarity measure. When the dot product is used, then the CCA correlation function is expressed as follows:

$$f(t,x) = f\_CCA\_dp(t,x) = tr(Tt)*Xx = tr(t)*M*x = \text{sum}\_\{i,j\} t\_i M\_\{ij\} \times j,$$

where "tr" equals transpose, and "M=tr(T)*X is (D_t by D_x)," and subscripts indicate vector components. This form supports a faster than exhaustive search for images or text given the other. For example, in text-based image search, images with feature vectors "x" are found such that "dot_prod(v,x)" is large, where "v=tr(t)*M."

For a squared Euclidean loss, the CCA correlation function may be expressed as follows:

$$f(t,x) = f\_CCA\_E(t,x) = \|Tt - Xx\|\_2^2.$$

Again, the simple closed form of the correlation function above may also support faster than exhaustive search for images or text given the other. For example, in text-based image search images with feature vectors "x" are found such that "f_CCA_E(t,x)" is small for a given text vector "t." Given "(T,X)" from fitting the CCA model and the query "t," linear algebra provides a set of vectors that minimize "f(t,x)" and images are found with feature vector "x" close to this set.

FIG. 8 depicts an example of a deep network 800 for correlating text and images as part of machine learning. The deep network 800 includes a text machine learning column 802 and an image machine learning column that are configured to learn the correlation "f(<S,P,O>,I)" between structured semantic knowledge "<S,P,O>" and an image or image portion "I" by non-linear mapping into a common space.

The text machine learning column 802 starts with a semantic text vector representation "t" that includes vec(S) 806, vec(P) 808, and vec(O) 810 which is then passed through sets of fully connected and activation layers 812 to output a non-linear mapping t->t' as a feature vector for the text 814.

The image machine learning column 804 is configured as a deep convolutional neural network 814 (e.g., as AlexNet or VGGNet or GoogLeNet with the final layers mapping to probabilities of class removed) that starts from image pixels of the image 816 and outputs a feature vector x' for the image 814. The image column is initialized as the training result of an existing CNN and the image features are fine tuned to correlate images with structured text capturing image attributes and interactions instead of just object class discrimination as in the existing CNN.

Adaptation layers 822, 824 in the text and image machine learning columns 802, 804 adapt the representations according to a non-linear function to map it into a common space with image features representing the same concept. A loss layer 828 joins the columns and penalizes differences in the outputs t' and x' of the text and image machine learning columns 802, 804 to encourage mapping into a common space for the same concept.

A discriminative loss function such as a ranking loss may be used to ensure that mismatched text and images have smaller correlation or larger distance than correctly matched text and images. For example, a simple ranking loss function may require correlations "dot_prod(t_i',x_i')>dot_prod(t_j', x_i')" for a training example "(t_i,x_i)" and where the original tuple for training tuple t_j does not match training image "x_i." A ranking loss may also use a semantic text similarity or an external object hierarchy such as ImageNet to formulate the loss to non-uniformly penalize different mismatches.

Other loss functions and architectures are possible, for example with fewer or more adaptation layers between the semantic text representation "t=[vec(S),vec(P),vec(O)]" and the embedding space t' or with connections between text and image layers before the common embedding space. In one example, a wild card loss that ignores the object part of embedding vectors for second order facts <S, P> and the predicate and object parts of embedding vectors for first order facts <S> is also possible.

Returning again to FIG. 3, at this point structured semantic knowledge 310 is obtained by the model training module 312 to solve the problem of extracting a concept relevant to an image region. The modeling above is now applied for "P(Concept <S,P,O>,Image I)" to extract all high probability concepts about a portion of an image. This may be performed without choosing the most probable concept. For example, consider an image region that contains a smiling man who is wearing a blue shirt. Image pixel data "I" for this region will have high correlation with both "<man, smiling>" and "<man, wearing, blue shirt>" and thus both these concepts may be extracted for the same image region.

The knowledge extraction task may be solved by applying the above model with image pixel data from regions identified by an object proposal algorithm or object regions identified by the R-CNN algorithm or even in a sliding window approach that more densely samples image regions. To capture object interactions, bounding boxes are generated from pairs of object proposals or pairs of R-CNN object regions. One approach is to try all pairs of potential object regions to test for possible interactions. Another approach is to apply some heuristics to be more selective, such as to not examine pairs that are distant in image. Since the model may be applied to extract zero, one, or more high probability concepts about an image region, the extracted <S,P,O> concepts may be localized to image regions that provide the corresponding visual data.

Example Procedures

The following discussion describes knowledge extraction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
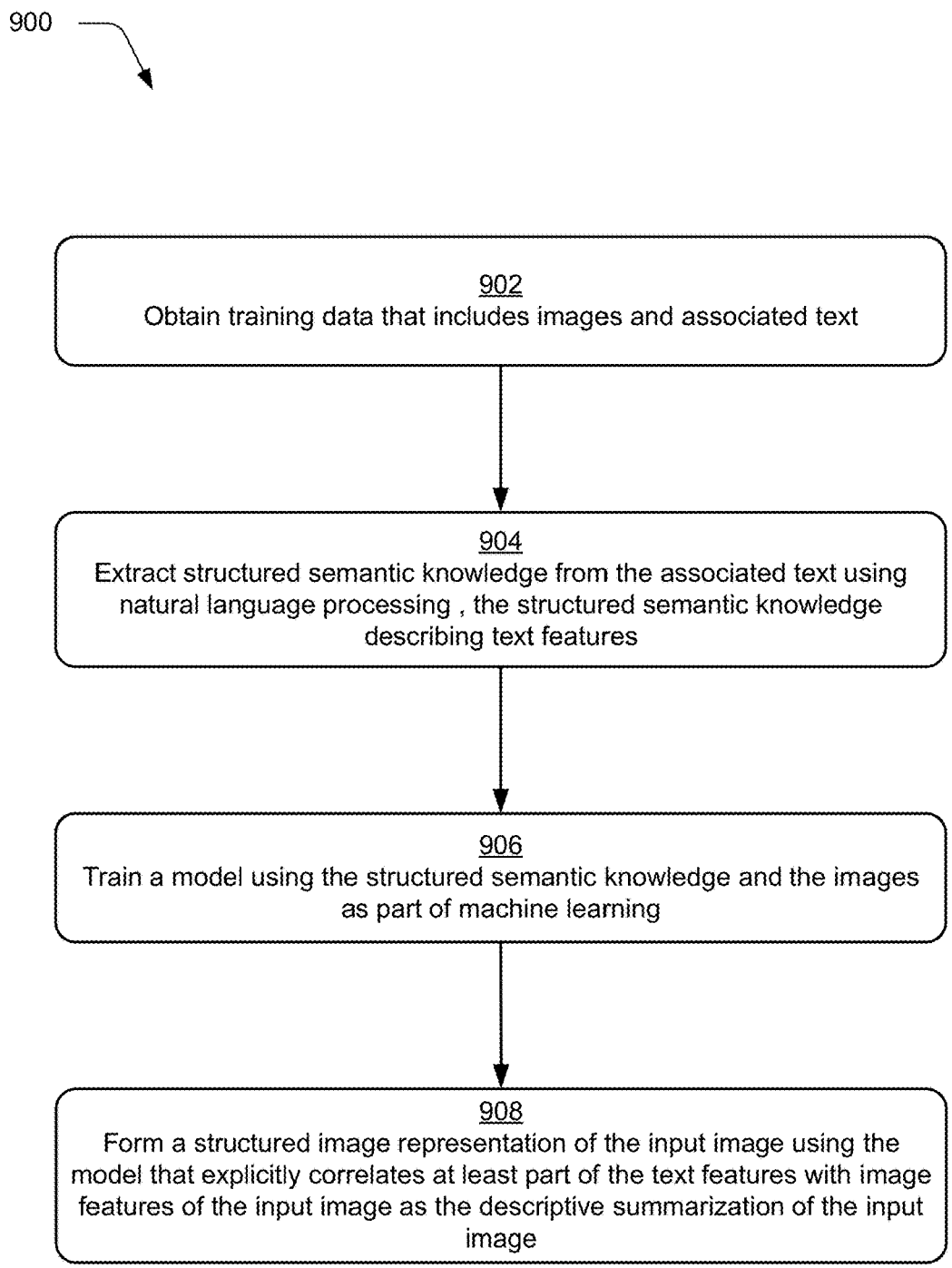
FIG. 9 is a flow diagram depicting a procedure in an example implementation in which a digital medium environment is employed to extract knowledge from an input image automatically and without user intervention.

FIG. 9 depicts a procedure 900 in an example implementation in which a digital medium environment is employed to extract knowledge from an input image automatically and without user intervention. A digital medium environment is described to learn a model that is usable to compute a descriptive summarization of an input image automatically and without user intervention. Training data is obtained that includes images and associated text (block 902). The training data 320, for instance, may include images 304 and unstructured text 306 that is associated with the images 304, e.g., as captions, metadata, and so forth.

Structured semantic knowledge is extracted from the associated text using natural language processing by the at least one computing device, the structured semantic knowledge describing text features (block 904). The structured semantic knowledge 310, for instance, may be extracted using natural language processing to generate tuples, such as <subject, attribute>, <subject, predicate, object>, and so forth.

A model is trained using the structured semantic knowledge and the images as part of machine learning (block 906). A model training module 312, for instance, may train a neural network using the images 304 and structured semantic knowledge 310. This knowledge may also be localized as described in greater detail in relation to FIG. 10.

The model is used to form a structured image representation of the input image that explicitly correlates at least part of the text features with image features of the input image as the descriptive summarization of the input image (block 908). The structured image representation, for instance, may correlate concepts in the text with portions of the images along with addressing a structure of the knowledge to describe "what is going on" in the images as a description summarization. This description summarization may be employed in a variety of ways, such as to locate images as part of an image search, perform automated generation of captions, and so on.

Figure 10:
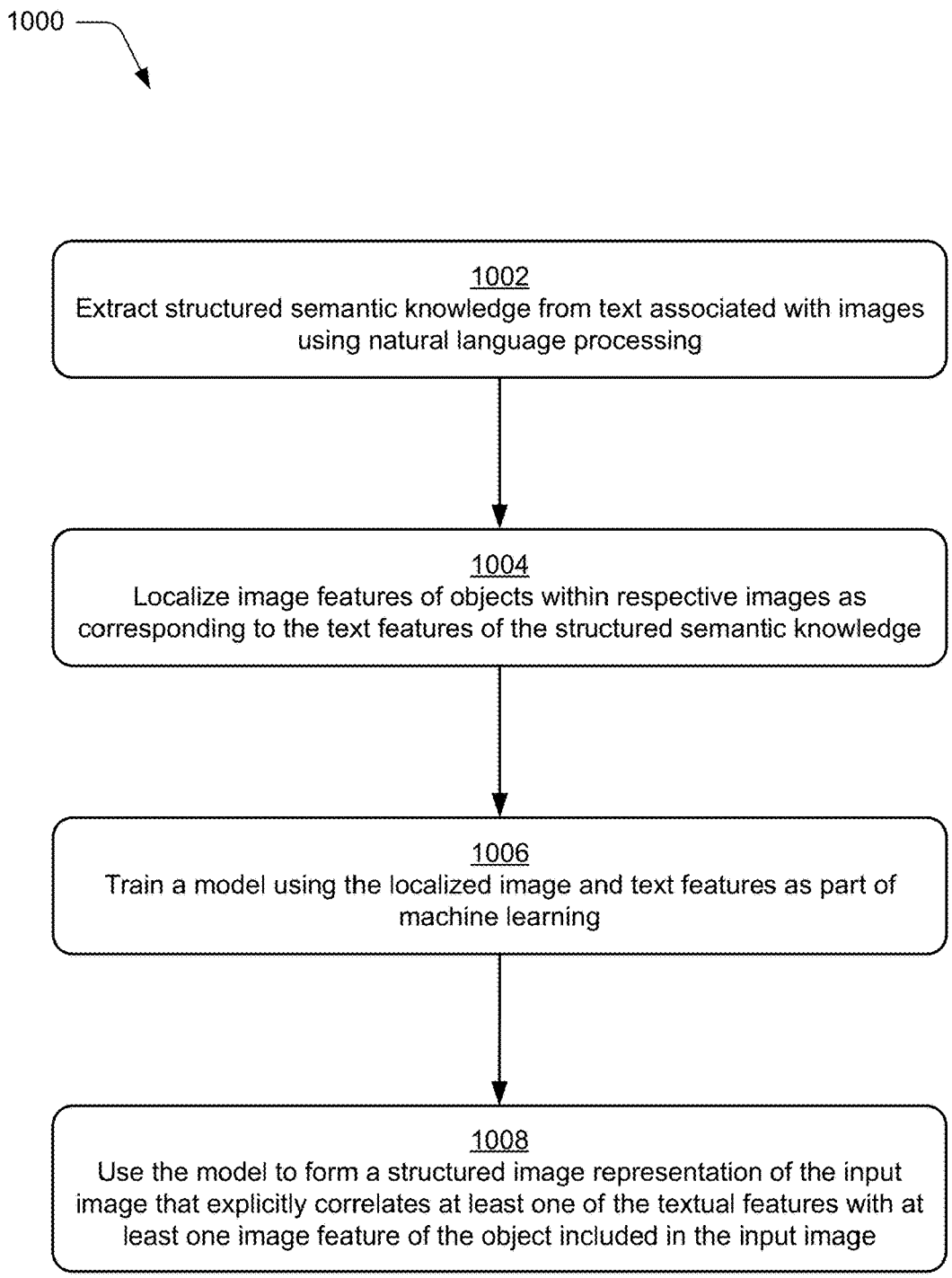
FIG. 10 is a flow diagram depicting a procedure in an example implementation in which a digital medium environment is employed to extract knowledge and localize text features to image features of an input image.

FIG. 10 depicts a procedure 1000 in an example implementation in which a digital medium environment is employed to extract knowledge and localize text features to image features of an input image. A digital medium environment is described to learn a model that is usable to compute a descriptive summarization of an object within an input image automatically and without user intervention. Structured semantic knowledge is extracted from text associated with images using natural language processing by the at least one computing device (block 1002). Image features of objects within respective said images is localized as corresponding to the text features of the structured semantic knowledge (block 1004). As before, structured semantic knowledge 310 is extracted. However, in this case this knowledge is localized to particular portions of the image and thus may improve accuracy of subsequent modeling by potentially differentiating between multiple concepts in an image, e.g., the baby holding the toy and the man feeding the baby as shown in FIG. 1.

A model is trained using the localized image and text features as part of machine learning (block 1006). A variety of different techniques may be used, such as to perform probabilistic modeling. The model is used to form a structured image representation of the input image that explicitly correlates at least one of the textual features with at least one image feature of the object included in the input image (block 1008). For example, the structured logic determination module 318 may take an input image 108 and form a structured image representation 106 especially in instances in which the input image 108 does not include associated text. Further, the structured image representation 106 may be localized to correlate concepts included in the text and image to each other. As before, the structured image representation 106 may be used to support a variety of functionality, such as image searches, automated caption generation, and so forth.

Implementation Example

Figure 11:
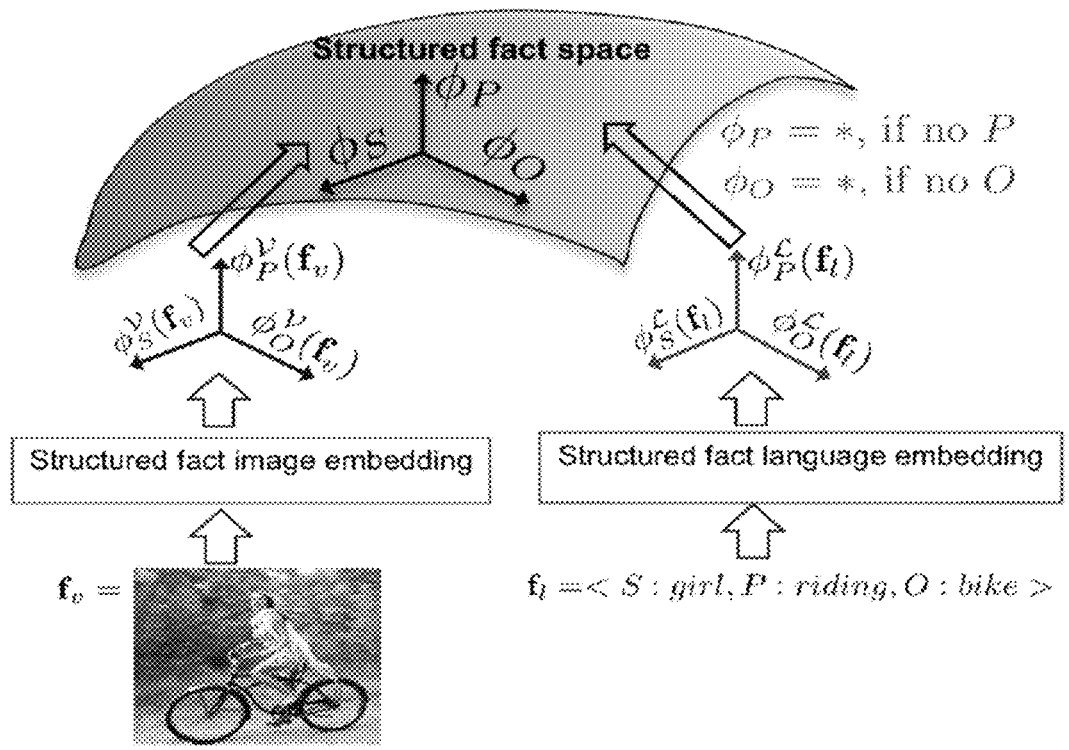
FIG. 11 depicts a system for structured face image embedding.

FIG. 11 depicts an example system 1100 usable to perform structured fact image embedding. This system 1100 support properties such as an ability to (1) can be continuously fed with new facts without changing the architecture, (2) is able to learn with wild cards to support all types of facts, (3) can generalize to unseen or otherwise not-directly observable facts, and (4) allows two way retrieval such as to retrieve relevant facts in a language view given an image and to retrieve relevant images give a fact in a language view. This system 1100 aims to model structured knowledge in images as a problem having views in the visual domain V and the language domain L. Let "f" be a structured "fact" (i.e., concept) and "$f_l \in L$" denotes the view of "f" in the language domain. For instance, an annotated fact, with language view "$f_l$=<S: girl, P: riding, O: bike>" would have a corresponding visual view "$f_v$" as an image where the fact occurs as shown in FIG. 11.

The system is configured to learn a representation that covers first-order facts <S> (objects), second-order facts <S, P> (actions and attributes), and third-order facts <S, P, O> (interaction and positional facts). These type of facts are represented as an embedding problem into a "structured fact space." The structured fact is configured as a learning representation of three hyper-dimensions that are denoted as follows:

$\phi_S \in \mathbb{R}^{d_S}$, $\phi_P \in \mathbb{R}^{d_P}$, and $\phi_O \in \mathbb{R}^{d_O}$ The embedding function from a visual view of a fact "$f_v$" are denoted as the following, respectively:

$\phi_S$, $\phi_P$, and $\phi_O$ as $\phi_S^v(f_v)$, $\phi_P^v(f_v)$, and $\phi_O^v(f_v)$ Similarly, the embedding function from a language view of a fact "$f_l$" are denoted:

$\phi_S$, $\phi_P$, and $\phi_O$ as respective ones of the following:

$\phi_S^\mathcal{L}(f_l)$, $\phi_P^\mathcal{L}(f_l)$, and $\phi_O^\mathcal{L}(f_l)$ The concatenation of the visual view hyper-dimensions' is denoted as:

$\phi^v(f_v)$

The concatenation of the language view hyper-dimensions' embedding is denoted as:

$\phi^\mathcal{L}(f_l)$ where the above are the visual embedding and the language embedding of "f", respectively, thereby forming:

$$\phi^v(f_v)=[\phi_S^v(f_v),\phi_P^v(f_v),\phi_O^v(f_v)],\ \phi^\mathcal{L}(f_l)=[\phi_S^\mathcal{L}(f_l), \phi_P^\mathcal{L}(f_l),\phi_O^\mathcal{L}(f_l)]$$

Thus, as is apparent from above the third-order facts <S, P, O> can be directly embedded to the structured face space by:

$$\phi^V(f_v)$$

for the image view and:

$$\phi^L(f_l)$$

for the language view.

First-order facts are facts that indicate an object like <S: person>. Second-order facts are more specific about the subject, e.g., <S: person, P: playing>. Third-order facts are even more specific, e.g., <S: person, P: playing, O: piano). In the following, higher order facts are defined as lower order facts with an additional modifier applied. For example, adding the modifier "P: eating" to the fact <S: kid> constructs the fact <S: kid, P: eating>. Further, applying the modifier "O: ice cream" to the fact <S: kid, P: eating> constructs the fact <S: kid, P: eating, O: ice cream>. Similarly, attributes may be addressed as modifiers to a subject, e.g., applying "P: smiling" to the fact <S: baby> constructs the fact <S: baby, P: smiling>.

Based on the fact modifier observation above, both first and second order facts may be represented as wild cards, as illustrated in the following equations for first-order and second-order facts, respectively.

$$\phi^V(f_v)=[\phi_S^V(f_v),\phi_P^V(f_v)=*,\phi_O^V(f_v)=*],\phi^L(f_l)=[\phi_S^L(f_l), \phi_P^L(f_l)=*, \phi_O^L(f_l)=*]$$

$$\phi^V(f_v)=[\phi_S^V(f_v),\phi_P^V(f_v),\phi_O^V(f_v)=*],\phi^L(f_l)=[\phi_S^L(f_l), \phi_P^L(f_l), \phi_O^L(f_l)=*]$$

Setting "$\phi_P$" and "$\phi_O$" to "*" for first-order facts is interpreted to mean that the "P" and "O" modifiers are not of interest for first-order facts. Similarly, setting "$\phi_O$" to "*" for second-order facts indicates that the "O" modifier is not of interest for single-frame actions and attributes.

Both first and second-order facts are named wild-card facts. Since modeling structured facts in visual data potentially allows logical reasoning over facts from images, the described problem is also referenced as a "Sherlock" problem in the following.

In order to train a machine learning model that connects the structured fact language view in L with its visual view in V, data is collected in the form of ($f_v$, $f_l$) pairs. Data collection for large scale problems has become increasingly challenging, especially in the below examples as the model relies on localized association of a structure language fact "$f_l$" with an image "$f_v$," when such facts occur. In particular, it is a complex task to collect annotations especially for second order facts <S, P> and third-order facts <S, P, O>. Also, multiple structured language facts may be assigned to the same image, e.g., <S: man, P; smiling> and <S: man, P: wearing, O: glass>. If these facts refer to the same man, the same image example could be used to learn about both facts.

As previously described, techniques are discussed in which fact annotations are automatically collected from datasets that come in the form of image/caption pairs. For example, a large quantity of high quality facts may be obtained from caption datasets using natural language processing. Since caption writing is free-form, these descriptions are typically readily available, e.g., from social networks, preconfigured databases, and so forth.

In the following example, a two-step automatic annotation process is described (i) fact extraction from captions which includes any text associated with an image that describes the image; and (ii) fact localization in images. First, the captions associated with the given image are analyzed to extract sets of clauses that are consider as candidate <S, P> and <S, P, O > facts in the image. Clauses form facts but are not necessarily facts by themselves.

Captions can provide rich amounts of information to image understanding systems. However, developing natural language processing systems to accurately and completely extract structured knowledge from free-form text is challenging due to (1) spelling and punctuation mistakes; (2) word sense ambiguity within clauses; and (3) spatial preposition lexicon that may include hundreds of terms such as "next to," "on top of," as well as collection phrase adjectives such as "group of," "bunch of," and so forth.

The process of localizing facts in an image is constrained by information in the dataset. For example, a database may contain object annotations for different objects by training and validation sets. This allows first-order facts to be localized for objects using bounding box information. In order to locate higher-order facts in images, visual entities are defined as any noun that is either a dataset object or a noun in a predefined ontology that is an immediate or indirect hypernym of one of the objects. It is expected that visual entitles appear either in the S or the O part, if it exists, for a candidate fact "$f_l$" which allows for the localization of facts for images. Given a candidate third-order fact, an attempt is first made to assign each "S" and "O" to one of the visual entities. If "S" and "O" are not visual entities, then the clause is ignored. Otherwise, the clauses are processed by several heuristics. The heuristics, for instance, may take into account whether the subject or the object is singular or plural, or a scene. For example, in the fact <S: men, P: chasing, O: soccer ball> the techniques described herein may identify that "men" may involve a union of multiple candidate bounding boxes, while for "soccer ball" it is expected that there is a single bounding box.

A straightforward way to model facts in images is to learn a classifier for each separate fact. However, there is a clear scalability limitation in this technique as the number of facts is signification, e.g., |S|×|P|×|O| where |S|, |P| and |O| are the number of subjects, predicates, and objects, respectively. Thus, this number could reach millions for possible facts in the real world. In addition to scalability problems, this technique discards semantic relationships between facts, which is a significant property that allows generalization to unseen facts or facts with few examples. For instance, during training there might be a second-order fact like <S: boy, P: playing> and a first-order fact like <S: girl>, <S: boy>. At run time, the model trained using the techniques described herein understands an image with the fact <girl, playing> even if this fact is not seen during training, which is clearly not captured by learning a model for each fact in the training.

Accordingly, a two-view embedding problem is described in this example that is used to model structured facts. For example, a structured fact embedding model may include (1) two-way retrieval (i.e., retrieve relevant facts in language view given and image, and retrieve relevant images given a fact in a language view; and (2) wild-card facts are supported, i.e., first and second order facts.

The first property is satisfied in this example by using a generative model $p(f_v, f_l)$ that connects the visual and the language views of "f." This technique first models the following:

$$p(f_v, f_l) \propto s(\phi^V(f_v), \phi^L(f_l))$$

where "s(•, •)" is a similarity function defined over the structured face space denoted by "S", which is a discriminative space of facts. This is performed such that two views of the same fact are embedded close to each other.

Figure 12:
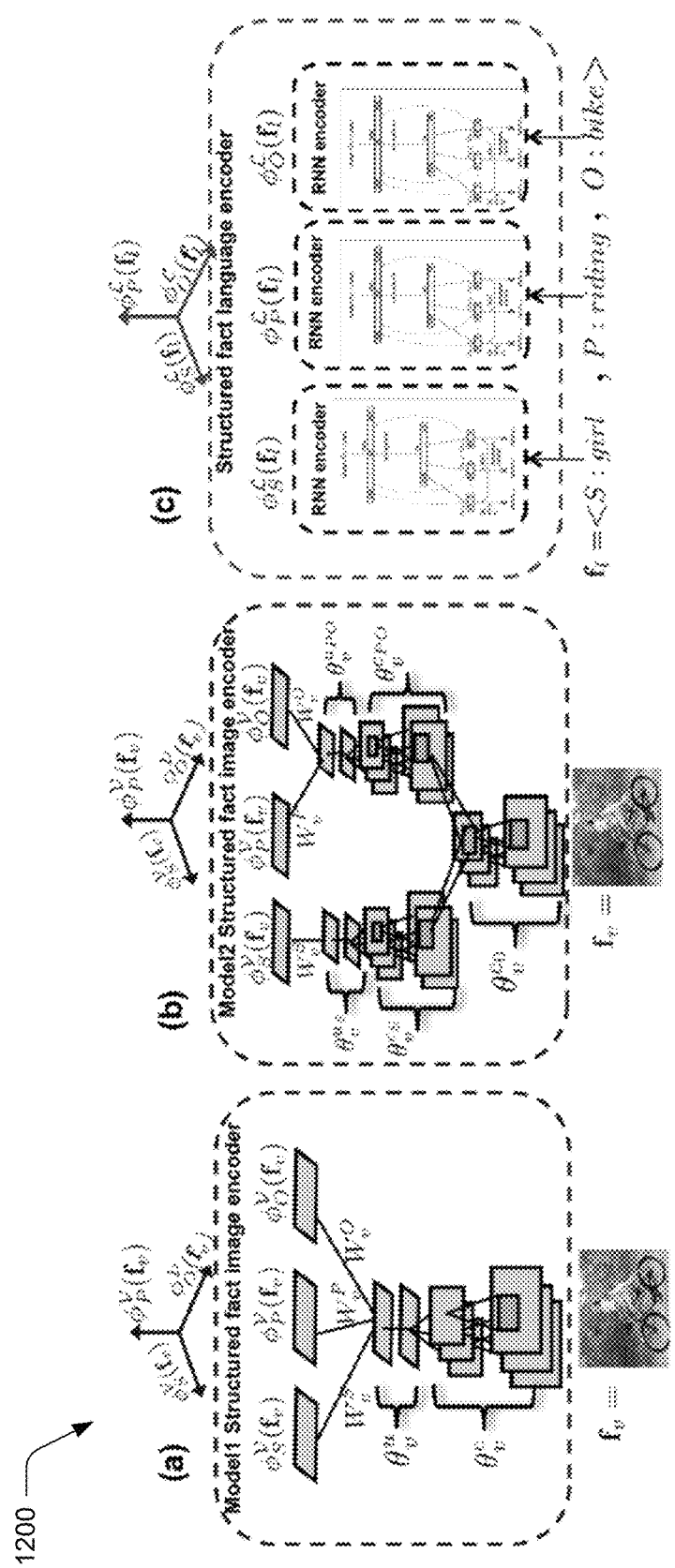
FIG. 12 depicts Model 1 and Model 2 as part of machine learning.

To model and train "$\phi^v(f_v)$", a CNN encoder is used and to train "$\phi^L(f_l)$" an RNN encoder is used. Two models are proposed for learning facts, denoted by Model 1 and Model 2 in an example implementation 1200 of FIG. 12. Models 1 and 2 share the same structured fact language embedding and encoder but differ in the structured fact image encoder.

This process starts by defining an activation operator "$\psi(\theta, \alpha)$" where "$\alpha$" is an input and "$\theta$" is a series of one or more neural network layers, which may include different layer types such as four convolution, one pooling, and another convolution and pooling. The operator "$\psi(\theta, \alpha)$" applies "$\theta$" parameters layer by layer to compute the active of "$\theta$" subnetwork given ""$\alpha$". An operator "$\psi(\bullet, \bullet)$" is used to define Model 1 and Model 2 structured fact image encoders.

In Model 1, a structured fact is visually encoded by sharing convolutional layer parameters (denoted by $\theta_c^v$) and fully connected layer parameters (denoted by $\theta_c^u$). Then, "$W_S^v$," "$W_P^v$," and "$W_O^v$," transformation matrices are applied to produce "$\phi_S^v(f_v), \phi_P^v(f_v), \phi_O^v(f_v)$" as follows:

$$\phi_S^v(f_v)=W_v^S\psi(\theta_v^u,\psi(\theta_v^c,f_v)), \phi_P^v(f_v)=W_v^P\psi(\theta_v^u,\psi(\theta_v^c,f_v)), \phi_O^v(f_v)=W_v^O\psi(\theta_v^u,\psi(\theta_v^c,f_v)),$$

In contrast to Model 1, different convolutional layers are used in Model 2 for "S" than for "P" and "O", as consistent with the above discussion that "P" and "O" are modifiers to "S" as previously described. Starting from "$f_v$," there is a common set of convolutional layers, denoted by "$\theta_v^{c0}$", then the network splits into two branches, producing two set of convolutional layers "$\theta_v^{cs}$" and "$\theta_v^{cP0}$" followed by two sets of fully connected layers "$\theta_v^{us}$" and "$\theta_v^{uP0}$". Finally, "$\phi_S^v(f_v), \phi_P^v(f_v), \phi_O^v(f_v)$" are computed by "$W_S^v$," "$W_P^v$," and "$W_O^v$," transformation matrices as follows:

$$\phi_S^v(f_v)=W_v^S\psi(\theta_v^{us},\psi(\theta_v^{cs},\psi(\theta_{c_0}^v,f_v))), \phi_P^v(f_v)=W_v^P\psi(\theta_v^{uP0},\psi(\theta_v^{cP0},\psi(\theta_{c_0}^v,f_v))), \phi_O^v(f_v)=W_v^O\psi(\theta_v^{uP0},\psi(\theta_v^{cP0},\psi(\theta_{c_0}^v,f_v)))$$

In both models, a structured language fact is encoded using RNN word embedding vectors for "S, P, and O." Hence, in the case "$\phi_S^L(f_L)=RNN_{\theta L}(f_S^L), \phi_P^L(f_L)=RNN_{\theta L}(f_S^P), \phi_O^L(f_L)=RNN_{\theta L}(f_L^O)$," where "$f_S^L$", "$f_S^P$" and "$f_L^O$" are the subject, predicate, and object parts of "$f_L \in L$". For each of these, the literals are dropped and if any of "$f_S^L$", "$f_S^P$" and "$f_L^O$" contain multiple words, the average vector is computed as the representation of that part. The RNN language encoder parameters are denoted by "$\theta^L$". In one or more implementations, "$\theta^L$" is fixed to a pre-trained word vector embedding model for "$f_S^L$", "$f_S^P$" and "$f_L^O$".

One way to model "$p(f_v, f_l)$" for Model 1 and Model 2 is to assume that "$p(f_v, f_l) \propto \exp(-loss_w(f_v, f_l))$" and minimize "$loss_w(f_v, f_l)$" distance loss which is defined as follows:

$$loss_w(f_v,f_l)=w_S^f\cdot\|\phi_S^v(f_v)-\phi_S^\mathcal{L}(f_l)\|^2+w_P^f\cdot\|\phi_P^v(f_v)-\phi_P^\mathcal{L}(f_l)\|^2+w_O^f\cdot\|\phi_O^v(f_v)-\phi_O^\mathcal{L}(f_l)\|^2$$

which minimizes the distances between the embedding of the visual view and the language view. A solution to penalize wild-card facts is to ignore the wild-card modifiers in the loss through use of a weighted Euclidean distance, the weighting of which is based on whether corresponding parts of the feature vectors are present, which is called a "wild card" loss. Here "$w_S^f=1$," "$w_P^f=1$," and "$w_O^f=1$" for <S, P, O> facts, "$w_S^f=1$," "$w_P^f=1$," and "$w_O^f=0$" for <S, P> facts, and "$w_S^f=1$," "$w_P^f=0$," and "$w_O^f=0$" for <S> facts. Hence "$loss_w$" does not penalize the "O" modifier for the second order facts or the "P" and "O" modifiers for first-order facts, which follows the above definition of a wild-card modifier.

Accordingly, this example describes a problem of associating high-order visual and language facts. A neural network approach is described for mapping visual facts and language facts into a common, continuous structured fact space that allows natural language facts to be associated with image and images to be associated with natural language structured descriptions.

Example System and Device

Figure 13:
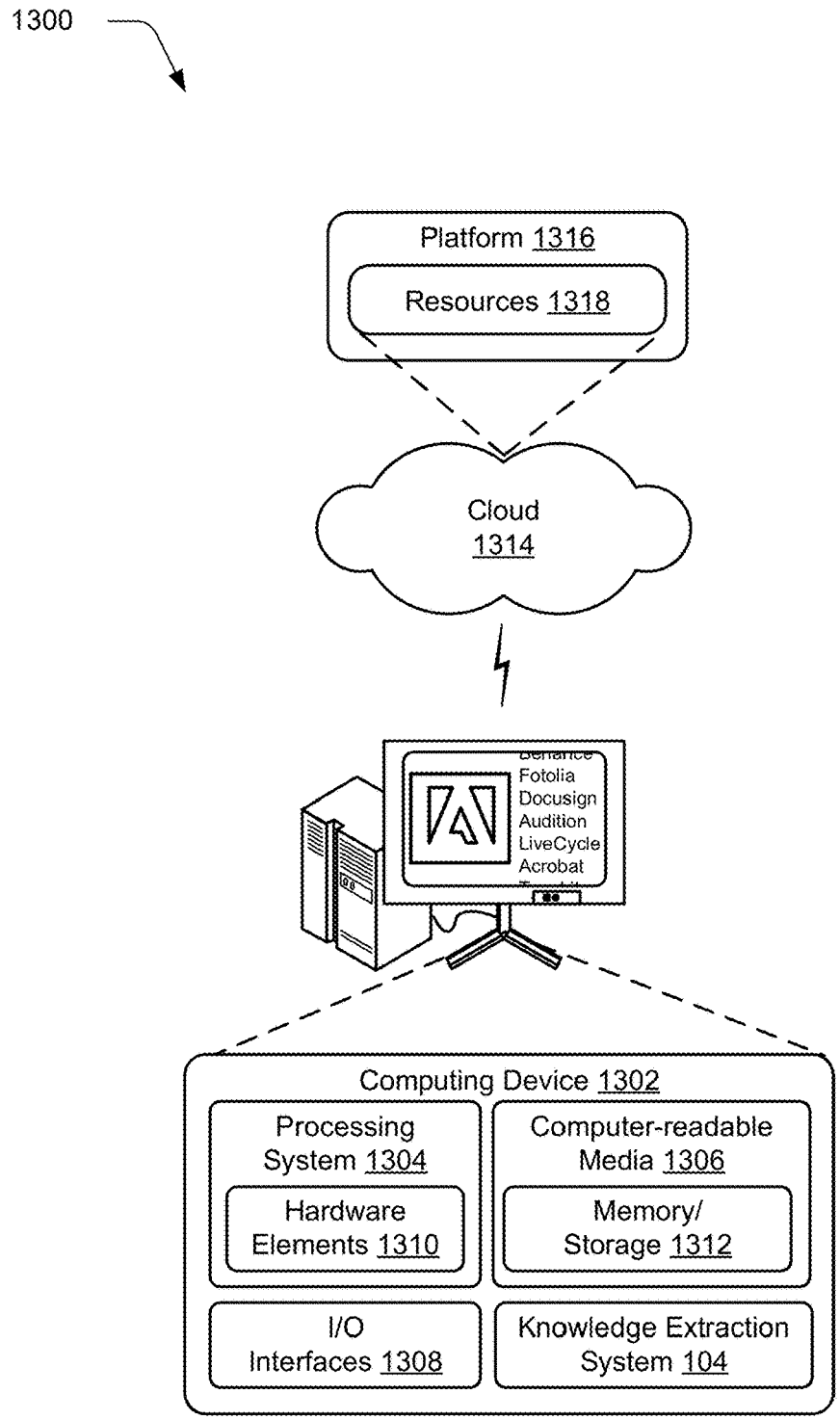
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the knowledge extraction system 104. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to learn a model that is usable to compute a descriptive summarization of objects, attributes, and how the objects interact with each other within an input image automatically and without user intervention, a method implemented by at least one computing device comprising:
   localizing image features within respective images, by the at least one computing device, as corresponding to text features of structured semantic knowledge extracted from text associated with the respective said images using natural language processing; and
   training a model using the localized images and the text features as part of machine learning by the at least one computing device; and
   using the model to form a structured image representation of the input image that explicitly correlates a singular subject text feature and an object text feature included in the structured semantic knowledge with at least one image feature of the objects included in the input image, including:
      identifying a class label associated with the subject text feature by mapping the subject text feature to the class label using a hierarchy identifying the class label as corresponding to the subject text feature;
      obtaining at least two bounding boxes in the input image associated with the class label;
      determining one bounding box of the at least two bounding boxes that corresponds to the subject text feature by determining a respective distance distance between a portion of the image corresponding to the object text feature and each respective one of the at least two bounding boxes, and selecting the one bounding box as corresponding to the subject text feature based on the distance associated with the one bounding box being less than a threshold distance; and
      localizing the singular subject text feature and the object text feature to the input image based on the one bounding box.

2. The method as described in claim 1, wherein the text associated with the images is free form and unstructured.

3. The method as described in claim 2, wherein the text is a caption or metadata of a respective said image.

4. The method as described in claim 1, wherein the structured semantic knowledge includes a <subject, attribute>tuple or a <subject, predicate, object>tuple.

5. The method as described in claim 1, wherein the using the model includes running at least one object detector on image regions for objects associated with the class label.

6. The method as described in claim 1, wherein the model employs pre-defined classes of subjects and objects and associated image regions of the images that include the subject and objects, respectively.

7. The method as described in claim 6, wherein the using the model is performed to consider occurrences of the pre-defined classes of subjects and objects have been localized as indicative that a respective item of the structured semantic knowledge describes an entirety of a scene included in a respective said image.

8. The method as described in claim 6, wherein if there is the single occurrence for a respective said subject class for a subject and a single occurrence for a respective object class for an object in at least one of the images then a corresponding item of the structured semantic knowledge is associated with an area of the at least one image that includes portions of the image having the subject and the object.

9. The method as described in claim 1, wherein there is plurality of subject class bounding boxes corresponding to the subject text feature and a plurality of object class bounding boxes corresponding to the object text feature, the localizing further including using relative positional information to select a pair of subject class and object class bounding boxes.

10. The method as described in claim 1, wherein the object text feature is a singular object text feature, a set of bounding boxes in the input image associated with the singular object text feature includes at least two bounding boxes, and wherein the determining further includes: determining a respective distance between a portion of the image corresponding to the subject text feature and each respective one of the at least two bounding boxes; and selecting one of the at least two bounding boxes of the set of bounding boxes associated with the object text feature as corresponding to the singular object text feature based on the corresponding distance being less than a threshold distance.

11. In a digital medium environment to learn a model that is usable to compute a descriptive summarization of objects, attributes, and how the objects interact with each other within an input image automatically and without user intervention, a system implemented by at least one computing device comprising:
   a model training module implemented at least partially in hardware that, responsive to execution by one or more processors of the at least one computing device, performs operations including:
      localizing image features within respective images, by the at least one computing device, as corresponding to text features of structured semantic knowledge extracted from text associated with the respective said images using natural language processing; and
      training a model using the localized images and the text features as part of machine learning by the at least one computing device; and
   a structured logic determination module implemented at least partially in hardware that, responsive to execution by one or more processors of the at least one computing device, performs operations including using the model to form a structured image representation of the input image that explicitly correlates a subject text feature and a singular object text feature included in the structured semantic knowledge with at least one image feature of the objects included in the input image by:
      identifying a class label associated with the object text feature by mapping the object text feature to the class label using a hierarchy identifying the class label as corresponding to the object text feature;
      obtaining at least two bounding boxes in the input image associated with the class label;
      determining one bounding box of the at least two bounding boxes that corresponds to the subject text feature by determining a respective distance between a portion of the image corresponding to the subject text feature and each respective one of the at least two bounding boxes, and selecting the one bounding box as corresponding to the object text feature based on the distance associated with the one bounding box being less than a threshold distance; and
      localizing the subject text feature and the singular object text feature to the input image based on the one bounding box.

12. The system as described in claim 11, wherein the structured semantic knowledge includes a <subject, attribute>tuple or a <subject, predicate, object>tuple.

13. The system as described in claim 11, wherein the model employs pre-defined classes of subjects and objects and associated image regions of the images that include the subject and objects, respectively.

14. The system as described in claim 13, wherein the using the model is performed to consider occurrences of the pre-defined classes of subjects and objects have been localized as indicative that a respective item of the structured semantic knowledge describes an entirety of a scene included in a respective said image.

15. The system as described in claim 13, wherein if there is the single occurrence for a respective said subject class for a subject and a single occurrence for a respective object class for an object in at least one of the images then a corresponding item of the structured semantic knowledge is associated with an area of the at least one image that includes portions of the image having the subject and the object.

16. The system as described in claim 11, wherein there is plurality of subject class bounding boxes corresponding to the subject text feature and a plurality of object class bounding boxes corresponding to the object text feature, the localizing further including using relative positional information to select a pair of subject class and object class bounding boxes.

17. The system as described in claim 11, wherein the subject text feature is singular, a set of bounding boxes in the input image associated with the subject text feature includes at least two bounding boxes, and wherein the determining further includes: determining a respective distance between a portion of the image corresponding to the object text feature and each respective one of the at least two bounding boxes; and selecting one of the at least two bounding boxes of the set of bounding boxes associated with the subject text feature as corresponding to the subject text feature based on the corresponding distance being less than a threshold distance.

18. In a digital medium environment to learn a model that is usable to compute a descriptive summarization of objects, attributes, and how the objects interact with each other within an input image automatically and without user intervention, a system implemented by at least one computing device comprising:
  means for localizing image features within respective images, by the at least one computing device, as corresponding to text features of structured semantic knowledge extracted from text associated with the respective said images using natural language processing; and
  means for training a model using the localized images and the text features as part of machine learning by the at least one computing device; and
  means for using the model to form a structured image representation of the input image that explicitly correlates a singular subject text feature and an object text feature included in the structured semantic knowledge with at least one image feature of the objects included in the input image, including:
    means for identifying a class label associated with the subject text feature by mapping the subject text feature to the class label using a hierarchy identifying the class label as corresponding to the subject text feature;
    means for obtaining at least two bounding boxes in the input image associated with the class label;
    means for determining one bounding box of the at least two bounding boxes that corresponds to the subject text feature by determining a respective distance between a portion of the image corresponding to the object text feature and each respective one of the at least two bounding boxes, and selecting the one bounding box as corresponding to the subject text feature based on the distance associated with the one bounding box being less than a threshold distance; and
    means for localizing the singular subject text feature and the object text feature to the input image based on the one bounding box.

19. The system as described in claim 18, wherein the object text feature is a singular object text feature, a set of bounding boxes in the input image associated with the singular object text feature includes at least two bounding boxes, and wherein the determining further includes: determining a respective distance between a portion of the image corresponding to the subject text feature and each respective one of the at least two bounding boxes; and selecting one of the at least two bounding boxes of the set of bounding boxes associated with the object text feature as corresponding to the singular object text feature based on the corresponding distance being less than a threshold distance.

20. The system as described in claim 18, wherein the structured semantic knowledge includes a <subject, attribute>tuple or a <subject, predicate, object>tuple.

* * * * *

UNITED STATES PATENT AND TRADEMARK OFFICE
CERTIFICATE OF CORRECTION

PATENT NO. : 10,460,033 B2
APPLICATION NO. : 14/978421
DATED : October 29, 2019
INVENTOR(S) : Scott D. Cohen et al.

It is certified that error appears in the above-identified patent and that said Letters Patent is hereby corrected as shown below:

In the Claims

Column 23, Line 33, Claim 1 after "distance", delete "distance", therefor.

Signed and Sealed this
Twenty-first Day of January, 2020

Andrei Iancu
*Director of the United States Patent and Trademark Office*